United States Patent [19]

Kayane et al.

[11] Patent Number: 4,511,507
[45] Date of Patent: Apr. 16, 1985

[54] MONOAZO COMPOUND HAVING BOTH MONOCHLOROTRIAZINYL AND VINYLSULFONE TYPE REACTIVE GROUPS

[75] Inventors: Yutaka Kayane, Moriguchi; Takashi Omura, Ashiya; Katsumasa Otake, Nara; Akira Takeshita, Toyonaka, all of Japan

[73] Assignee: Sumitomo Chemical Company, Limited, Osaka, Japan

[21] Appl. No.: 563,587

[22] Filed: Dec. 20, 1983

[30] Foreign Application Priority Data

Dec. 28, 1982 [JP] Japan .................. 57-231040

[51] Int. Cl.$^3$ .............. C09B 62/08; D06P 3/10
[52] U.S. Cl. ........................ 534/629; 8/549; 8/682; 8/688; 8/918
[58] Field of Search ............. 8/549, 682; 260/153

[56] References Cited

U.S. PATENT DOCUMENTS

| | | | |
|---|---|---|---|
| 3,223,470 | 12/1965 | Boedeker et al. .............. | 8/548 |
| 3,455,897 | 6/1969 | Barben .......................... | 8/674 |
| 4,341,699 | 7/1982 | Tezuka et al. ................. | 260/153 |
| 4,378,313 | 3/1983 | Kayane et al. ................. | 260/153 |

FOREIGN PATENT DOCUMENTS

| | | |
|---|---|---|
| 35171 | 9/1981 | European Pat. Off. . |
| 52985 | 6/1982 | European Pat. Off. . |
| 65211 | 11/1982 | European Pat. Off. . |
| 2026527 | 2/1980 | United Kingdom . |

Primary Examiner—A. Lionel Clingman

Attorney, Agent, or Firm—Stevens, Davis, Miller & Mosher

[57] ABSTRACT

A monoazo compound which is useful for dyeing or printing fiber materials, particularly cellulose fiber materials in red color, and which is represented by a free acid of the formula,

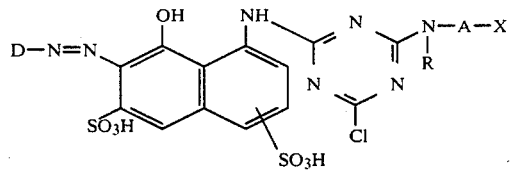

wherein D is a phenyl group substituted with one to three substituents selected from the group consisting of halogen atoms and methyl, ethyl, methoxy, ethoxy, acetylamino, propionylamino, sulfo and carboxyl groups, R is a $C_1$ to $C_4$ alkyl group unsubstituted or substituted with a halogen atom or a hydroxyl, cyano, alkyl, alkoxy, carboxyl, carbamoyl, alkoxycarbonyl or sulfo group, A is a phenylene group unsubstituted or substituted with one or two substituents selected from the group consisting of methyl, ethyl, methoxy, ethoxy and sulfo groups and chlorine and bromine atoms, or a naphthylene group unsubstituted or substituted with one sulfo group, and X is $-SO_2CH=CH_2$ or $-SO_2CH_2CH_2Y$ in which Y is a group capable of being split by the action of an alkali.

5 Claims, No Drawings

MONOAZO COMPOUND HAVING BOTH MONOCHLOROTRIAZINYL AND VINYLSULFONE TYPE REACTIVE GROUPS

The present invention relates to a fiber reactive compound useful for dyeing and printing materials such as cellulose fiber, nitrogen-containing fiber and leather.

More specifically, the invention relates to a monoazo compound having both monochlorotriazinyl and vinylsulfone type fiber reactive groups in one molecule and useful for dyeing and printing such materials in a red color.

The compound having both such fiber reactive groups are disclosed, for example, in U.S. Pat. No. 3,223,470 and Published Unexamined Japanese Patent Application No. 178/1980.

However, these known compounds still wait for an improvement of dye performances to give a dyed product meeting with various requirements in a dyeing industry.

The present inventors have studied to find a compound having excellent dye performances, and as a result, found that a monoazo compound having a specific structure can give a dyed product meeting with various requirements in the dyeing industry.

The present invention relates to a monoazo compound represented by a free acid of formula (I)

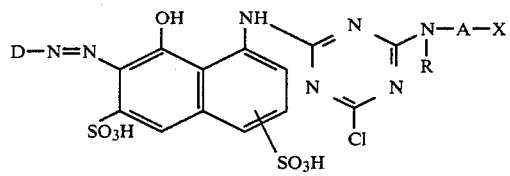

wherein D is a phenyl group substituted with one to three substituents selected from the group consisting of halogen atoms and methyl, ethyl, methoxy, ethoxy, acetylamino, propionylamino, sulfo and carboxyl groups, R is a $C_1$ to $C_4$ alkyl group unsubstituted or substituted with a halogen atom or a hydroxyl, cyano, alkoxy, carboxyl, carbamoyl, alkoxycarbonyl or sulfo group, A is a phenylene group unsubstituted or substituted with one or two substitutents selected from the group consisting of methyl, ethyl, methoxy, ethoxy and sulfo groups and chlorine and bromine atoms, or a naphthylene group unsubstituted or substituted with one sulfo group, and X is $-SO_2CH=CH_2$ or $-SO_2CH_2CH_2Y$ in which Y is a group capable of being splitted by the action of an alkali, and a process for producing the monoazo compound of formula (I), which comprises reacting an aromatic amine of formula (II),

D—NH$_2$ (II)

wherein D is as defined above, a naphthalene-disulfonic acid of formula (III),

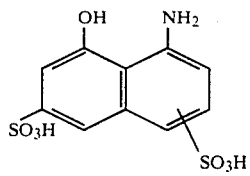

an amine compound of formula (IV),

wherein A, R and X are as defined above, and cyanuric chloride in an optional order. The invention also provides a process for dyeing or printing fiber materials, which comprises using the monoazo compound of formula (I).

Of the monoazo compounds (I) in the present invention, preferable compounds are those having the following formula,

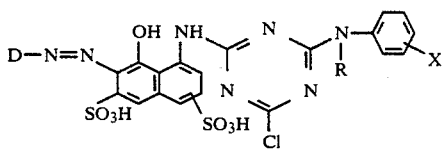

wherein D, R and X are as defined above.

Particularly preferable compounds are those having the following formulas,

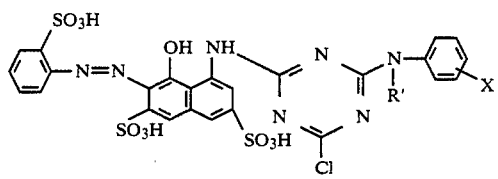

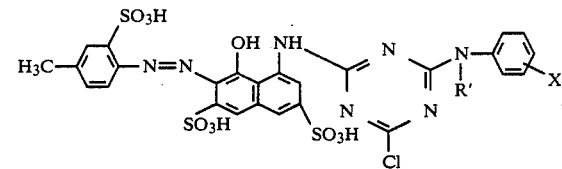

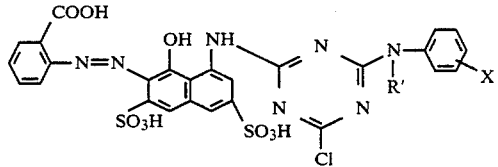

wherein X is as defined above, and R' is an unsubstituted $C_1$ to $C_4$ alkyl group.

The monoazo compounds (I) of the present invention may be in the form of a free acid or a salt, particularly an alkali or alkaline earth metal salt. Preferred are sodium, potassium and calcium salts. When used for dyeing or printing fiber materials, the monoazo compound (I) is preferably in the form of an alkali metal salt.

The monoazo compound (I) can be prepared in the following manner.

The aromatic amine (II) is diazotized using an aqueous medium in a conventional manner and then coupled with an N-acyl compound of the naphthalene-disulfonic acid (III) at a temperature of 0° to 30° C., while controlling the pH within a range of between 5 and 9. Thereafter, the reaction product is subjected to hydrolysis of the acyl group at a temperature of 50° to 100° C. in the presence of an acid or an alkali, whereby a monoazo intermediate of formula (V),

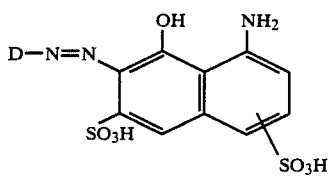

wherein D is as defined above, is obtained.

The monoazo intermediate (V) is then subjected to first condensation with cyanuric chloride in an aqueous medium at a temperature of 0° to 30° C., while controlling the pH within a range of between 3 and 7. The reaction mixture containing the corresponding dichlorotriazinyl compound is then subjected to second condensation with the amine compounds (IV) at a temperature of 30° to 60° C., while controlling the pH within a range of between 4 and 7, whereby the monoazo compound (I) is obtained.

Alternatively, the amine compounds (IV) is subjected to first condensation with cyanuric chloride in an aqueous medium at a temperature of 0° to 30° C., while controlling the pH within a range of between 3 and 7, followed by a second condensation with the monoazo intermediate (V) at a temperature of 20° to 50° C., while controlling the pH within a range of between 4 and 7. Thus, the monoazo compound (I) is also obtained.

Moreover, the monoazo compound (I) can also be prepared in the following manner.

The naphthalene-disulfonic acid (III) and the amine compound (IV) are subjected to condensation with cyanuric chloride in an optional order, in which the first condensation is carried out in an aqueous medium at a temperature of 0° to 30° C., while controlling the pH within a range of between 3 and 7, and the second condensation is carried out at a temperature of 20° to 60° C., while controlling the pH within a range of between 4 and 7, whereby a monochlorotriazinyl compound of formula (VI),

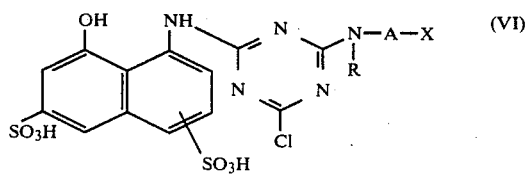

wherein A, R and X are as defined above, is obtained. The monochlorotriazinyl compound (VI) is then subjected to coupling with a diazonium salt of the aromatic amine (II) at a temperature of 0° to 30° C., while controlling the pH within a range of between 5 and 9.

Examples of the aromatic amine (II) are as follows:
2-Aminobenzenesulfonic acid
2-Amino-5-methylbenzenesulfonic acid
2-Amino-5-ethylbenzenesulfonic acid
2-Amino-5-methoxybenzenesulfonic acid
2-Amino-5-ethoxybenzenesulfonic acid
2-Amino-5-chlorobenzenesulfonic acid
2-Amino-5-bromobenzenesulfonic acid
2-Amino-5-acetylaminobenzenesulfonic acid
2-Amino-5-propionylaminobenzenesulfonic acid
2-Amino-4-chloro-5-methylbenzenesulfonic acid
2-Amino-5-chloro-4-methylbenzenesulfonic acid
2-Amino-4-methoxybenzenesulfonic acid
2-Amino-4-ethoxybenzenesulfonic acid
3-Amino-4-methylbenzenesulfonic acid
3-Amino-4-ethylbenzenesulfonic acid
3-Amino-4-methoxybenzenesulfonic acid
3-Amino-4-ethoxybenzenesulfonic acid
3-Amino-4-chlorobenzenesulfonic acid
3-Amino-4-bromobenzenesulfonic acid
4-Amino-3-methylbenzenesulfonic acid
4-Amino-3-ethylbenzenesulfonic acid
4-Amino-3-methoxybenzenesulfonic acid
4-Amino-3-ethoxybenzenesulfonic acid
4-Amino-3-chlorobenzenesulfonic acid
2-Aminobenzene-1,4-disulfonic acid
2-Aminobenzene-1,5-disulfonic acid
2-Aminobenzoic acid
2-Amino-4-methoxybenzoic acid
2-Amino-5-methoxybenzoic acid
2-Amino-4-acetylaminobenzoic acid
2-Amino-5-acetylaminobenzoic acid
2-Amino-4-sulfobenzoic acid
2-Amino-5-sulfobenzoic acid
4-Amino-2,5-dimethylbenzenesulfonic acid
4-Amino-2,5-diethylbenzenesulfonic acid
4-Amino-2,5-dimethoxybenzenesulfonic acid
4-Amino-2,5-diethoxybenzenesulfonic acid
4-Amino-2,5-dichlorobenzenesulfonic acid
4-Amino-2,5-dibromobenzenesulfonic acid
4-Amino-2-methyl-5-methoxybenzenesulfonic acid
4-Amino-2-methyl-5-ethoxybenzenesulfonic acid
2-Amino-5-methylbenzene-1,4-disulfonic acid
2-Amino-5-ethylbenzene-1,4-disulfonic acid
2-Amino-5-methoxybenzene-1,4-disulfonic acid
2-Amino-5-ethoxybenzene-1,4-disulfonic acid
2-Amino-5-acetylaminobenzene-1,4-disulfonic acid
2-Amino-5-propionylaminobenzene-1,4-disulfonic acid Examples of the naphthalene-disulfonic acid (III) include 1-amino-8-hydroxynaphthalene-3,6-disulfonic acid and 1-amino-8-hydroxynaphthalene-4,6-disulfonic acid.

Examples of R in the formula (IV) representing the amine compound include methyl, ethyl, propyl, isopropyl, butyl, sec-butyl, hydroxymethyl, 2-hydroxyethyl, 2-hydroxypropyl, 3-hydroxypropyl, 2-hydroxybutyl, 4-hydroxybutyl, 1-methyl-2-hydroxypropyl, cyanomethyl, cyanoethyl, methoxymethyl, 2-methoxyethyl, 3-methoxypropyl, ethoxymethyl, 2-ethoxyethyl, chloromethyl, 2-chloroethyl, 3-chloropropyl, 4-chlorobutyl, carboxymethyl, 2-carboxyethyl, carbamoylmethyl, 2-carbamoylethyl, 2-methoxycarbonoylethyl, 2-ethoxycarbonylmethyl, sulfomethyl, 2-sulfoethyl and other groups, and examples of A are as follows:

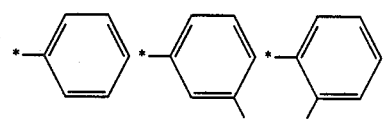

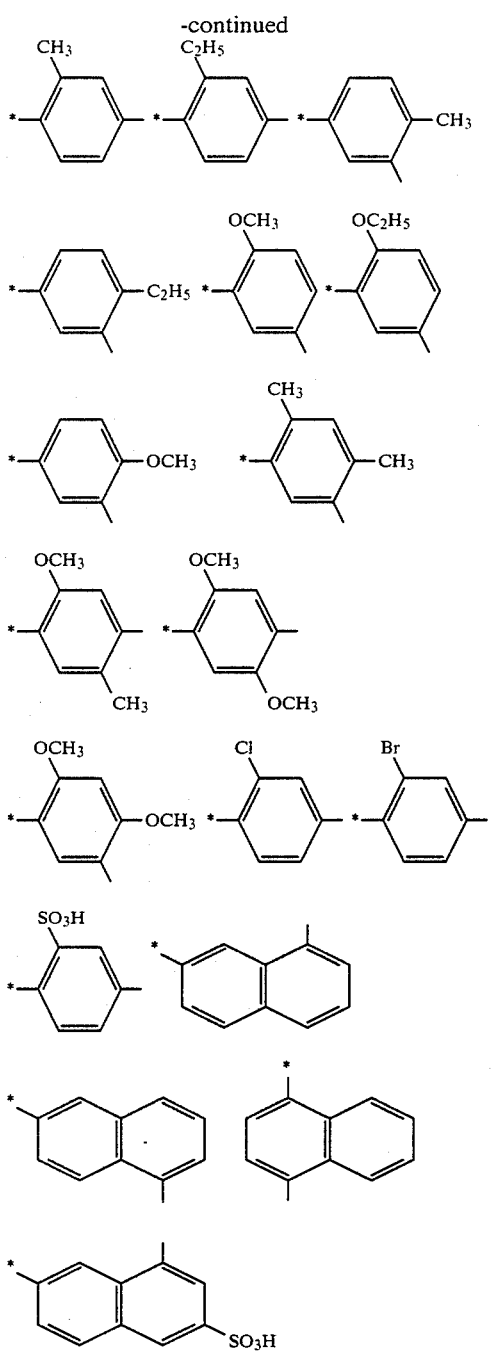

(In the above formulas, the asterisked linkage is bonded to the group,

.)

X in the formula (IV) is as defined above, and examples of Y representing the group splittable by the action of an alkali are a sulfuric acid ester, phosphoric acid ester or acetic acid ester group and a halogen atom.

The monoazo compound (I) in accordance with the present invention is fiber-reactive and can exhibit markedly excellent properties when applied for dyeing or printing natural or regenerated cellulose fiber materials, natural or synthetic polyamide fiber materials, polyurethane fiber materials, leather and the like.

Preferable cellulsoe fibers include cotton and regenerated cellulose, and in the present invention, there are included other vegetable fibers such as linen, hemp, jute and the like. Natural and synthetic polyamide fibers include wool, other animal fur, silk, polyamide-6,6, polyamide-6, polyamide-11, polyamide-4 and the like.

The monoazo compound (I) of the present invention can be applied particularly favorably for dyeing or printing the cellulose fiber materials. The dyeing and printing may be carried out in a conventional manner known for fiber-reactive dyes.

For example, the dyeing may be carried out in an exhaustion dyeing method, which comprises using a dye bath containing an acid binding agent such as sodium carbonate, trisodium phosphate, sodium hydroxide and the like, and an inorganic salt such as sodium sulfate, sodium chloride and the like at a relatively low temperature.

The printing may be carried out in a manner such that a color paste containing urea, an acid binding agent such as sodium bicarbonate, sodium carbonate, trisodium phosphate, sodium hydroxide and the like, and a sizing agent such as, preferably, sodium alginate, is printed on the fiber, and the fiber is pre-heated and then subjected to steam-heating or dry heating at 100° to 200° C.

The dyeing may be also carried out by a continuous dyeing method or a cold pad batch dyeing method.

The monoazo compound (I) of the present invention exhibits a prominent physical and chemical stability, when stored in the form of a dyeing solution or a printing paste even in the presence of an alkali, and a favorable affinity to the fibers and an excellent build-up property, when used for the dyeing and printing of the fibers. Further, in the exhaustion dyeing method, it is relatively insensitive to the changes of bath ratio or dyeing temperature, giving a dyed product of excellent levelling property with good reproducibility.

The dyed or printed products with the monoazo compound (I) of the present invention are high in the tinting strength and excellent in gloss and various fastnesses, particularly fastness to chlorine, light and perspiration-light.

In the above-mentioned U.S. Pat. No. 3,223,470, there are disclosed some compounds prepared using a compound having hydrogen as R in the formula (IV), and in the Japanese Patent Application No. 178/1980, some compounds prepared using an aromatic amine having a naphthalene residue as D in the formula (II). Comparing with these known compounds, each corresponding monoazo compound (I) of the present invention has advantages such that the solubility in water is higher, the alkali stability is more favorable, the exhaustion and fixing ratios in the exhaustion dyeing method and the fixing ratio in the printing method are higher, respectively, to obtain a dyed product of a deeper color, and moreover a wash-off property is more excellent, so that the unfixed dye can be removed in an easier manner.

The present invention is illustrated in more detail with reference to the following Examples, which are not intended to limit the scope of the present invention. In Examples, parts are by weight.

EXAMPLE 1

Cyanuric chloride (9.2 parts) was added and dispersed into a solution prepared by dissolving a nonionic surfactant (0.1 part) in water (100 parts).

To this dispersion, a solution prepared by dissolving 1-amino-8-hydroxynaphthalene-3,6-disulfonic acid (H acid) (16 parts) in water (100 parts) at a pH of between 7 and 8 was dropwise added at a temperature of between 0° and 5° C. taking over 1 hour. Thereafter, a 20% aqueous solution of sodium carbonate was added thereto to adjust the pH to 3, and the mixture was stirred for 2 hours. Successively, 1-N-ethylaminobenzene-3-β-sulfatoethylsulfone (16 parts) was added thereto, and the mixture is heated to a temperature of 40° C., while adding a 20% aqueous solution of sodium carbonate to adjust the pH to between 5 and 6, and then stirred for 6 hours at that temperature.

The reaction mixture was then cooled to a temperature of between 0° and 5° C., and mixed with sodium hydrogencarbonate (12.6 parts). A solution prepared by diazotizing 2-aminobenzenesulfonic acid (8.6 parts) in a usual manner was added to the above reaction mixture taking over 1 hour at a temperature of between 0° to 5° C. The mixture was stirred for 2 hours at that temperature, and then adjusted to a pH of between 5 and 6 by the addition of hydrochloric acid. Thereafter, sodium chloride (40 parts) was added thereto to deposit crystals, which were then collected on a suction filter, washed and dried at a temperature of 60° C. Thus, a compound of the following formula (1) was obtained.

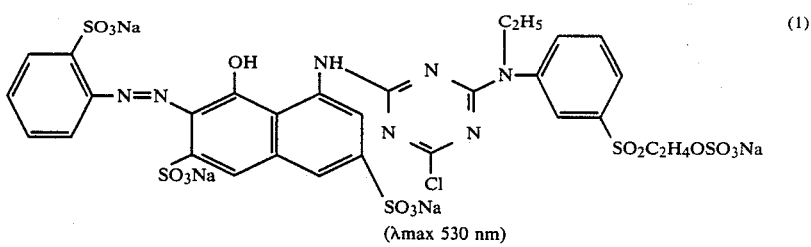

(λmax 530 nm)

DYEING EXAMPLE 1

The compound of formula (1) (0.3 part) was dissolved in water (200 parts), and sodium sulfate (20 parts) was added thereto to prepare a dye bath. Cotton (10 parts) was dipped into the dye bath, and the bath was heated to 60° C. 30 Minutes thereafter, sodium carbonate (4 parts) was added thereto, and the dyeing was continued for 1 hour at that temperature. After completion of the dyeing, the cotton was washed with water and soaped. Thus, a dyed product of a deep red color excellent in various fastness was obtained.

EXAMPLES 2 TO 5

A manner similar to that of Example 1 was repeated to obtain each compound as shown below, which compound was used for dyeing cotton in the same manner as in Dyeing Example 1 to obtain a dyed product of a shade as shown below having excellent fastness.

| Example No. | Formula | Shade |
|---|---|---|
| 2 | (structure with SO₃Na, OH, NH, CH₃, N, N, Cl, SO₃Na, SO₂C₂H₄OSO₃Na) | Red |
| 3 | (structure with CH₃, SO₃Na, OH, NH, C₂H₅, N, N, OCH₃, Cl, SO₃Na, SO₂C₂H₄OSO₃Na) | Bluish red |
| 4 | (structure with CH₃O, SO₃Na, OH, NH, C₃H₇, N, N, Cl, SO₃Na, SO₂C₂H₄OSO₃Na) | Bluish red |

| Example No. | Formula | Shade |
|---|---|---|
| 5 | 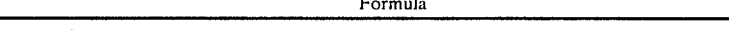 | Bluish red |

EXAMPLE 6

Cyanuric chloride (9.2 parts) was added and dispersed into a solution prepared by dissolving a nonionic surfactant (0.1 part) in water (100 parts). To this dispersion, a solution prepared by dissolving 1-N-ethylamino-benzene-4-β-sulfatoethylsulfone (15 parts) in water (100 parts) at a pH of between 4 and 5, was dropwise added at a temperature of between 10° and 15° C. taking over 1 hour. Thereafter, a 20% aqueous solution of sodium carbonate was added thereto to adjust the pH to 3, and the mixture was stirred for 2 hours. Successively, H acid (16 parts) was added thereto, and the mixture was heated to a temperature of 40° C., while adding a 20% aqueous solution of sodium carbonate to adjust the pH to between 5 and 6, and then stirred for 2 hours at that temperature.

The reaction mixture was then cooled to a temperature of between 0° to 5° C., and mixed with sodium hydrogencarbonate (12.6 parts). A solution prepared by diazotizing 2-amino-5-methylbenzenesulfonic acid (8.6 parts) in a usual manner was added to the above reaction mixture at a temperature of between 0° and 5° C. taking over 1 hour. The mixture was stirred for 2 hours at that temperature and then adjusted to a pH of between 5 and 6 by the addition of hydrochloric acid. Thereafter, sodium chloride (60 parts) was added thereto to deposit crystals, which were then collected on a suction filter, washed and dried at a temperature of 60° C. Thus, a compound of the following formula (6) was obtained.

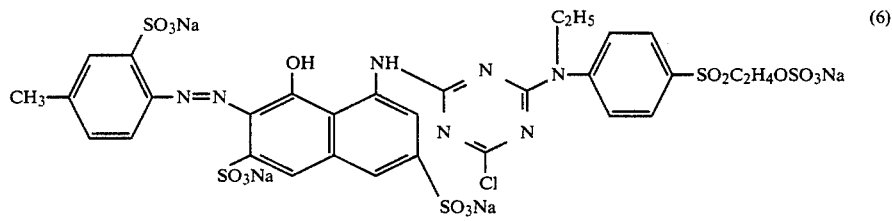

(λmax 544 nm)

DYEING EXAMPLE 2

The compound of formula (6) (0.3 part) was dissolved in water (200 parts), and sodium sulfate (30 parts) was added thereto to prepare a dye bath. Cotton (10 parts) was dipped into the bath, and the bath was heated to 60° C. 30 Minutes thereafter, trisodium phosphate (4 parts) was added thereto, and the dyeing was continued for 1 hour at that temperature. After completion of the dyeing, the cotton was washed with water and soaped to obtain a dyed product of a deep bluish red color excellent in various fastness.

EXAMPLES 7 TO 10

A similar manner to that of Example 6 was repeated to obtain each compound as shown below, which compound was used for dyeing cotton in the same manner as in Dyeing Example 2 to obtain a dyed product of a shade as shown below having excellent fastness.

| Example No. | Formula | Shade |
|---|---|---|
| 7 | 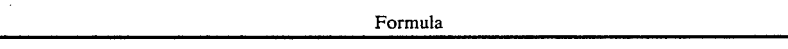 | Red |

-continued

| Example No. | Formula | Shade |
|---|---|---|
| 8 | (structure with SO3Na, C2H5O, OH, NH, CH3, N, SO2C2H4OSO3Na, SO3Na, Cl, SO3Na) | Bluish red |
| 9 | (structure with SO3Na, Cl, OH, NH, C2H5, N, SO2CH=CH2, Cl, SO3Na, Cl, SO3Na) | Red |
| 10 | (structure with SO3Na, C2H5, OH, NH, CH3, N, SO2C2H4OPO3Na, OCH3, SO3Na, Cl, SO3Na) | Red |

EXAMPLE 11

H Acid (31.9 parts) was dissolved in water (150 parts) with the addition of sodium hydroxide to adjust the pH to between 6 and 7, and sodium hydrogencarbonate (8.4 parts) was added thereto. To this solution, maleic anhydride (9.8 parts) was added at a temperature of between 20° and 25° C., and the mixture was stirred for 1 hour at this temperature.

A solution prepared by diazotizing 2-aminobenzenesulfonic acid (17.3 parts) at a temperature of between 5° and 10° C. in a conventional manner was added to the above mixture, while adding a 20% aqueous solution of sodium carbonate to adjust the pH to between 5 and 6. The resulting mixture was stirred for 3 hours at that temperature, then mixed with sodium hydroxide (6.0 parts), and heated to 80° C. The mixture was kept for 4 hours at this temperature, and then adjusted to a pH of between 6 and 7 by the addition of hydrochloric acid. Successively, sodium chloride was added thereto in an amount of 15% by volume based on the volume of the mixture to deposit crystals, which were collected on a filter. Thus, a compound of the following formula was obtained.

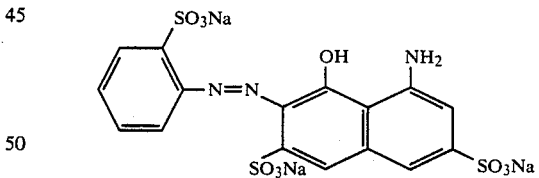

To a solution prepared by dissolving the above compound (28 parts) in water (500 parts), cyanuric chloride (9.3 parts) was added, and the mixture was stirred for 2 hours at a temperature of between 5° and 10° C., while adding a 20% aqueous solution of sodium carbonate to adjust the pH to between 4 and 5.

Successively, 1-N-hydroxyethylaminobenzene-3-β-sulfatoethylsulfone (16 parts) was added thereto, and the mixture was heated to a temperature of 50° C., while adding a 20% aqueous solution of sodium carbonate to adjust the pH to between 5 and 6, and then stirred for 6 hours at that temperature.

Sodium chloride (40 parts) was added to the reaction mixture to deposit crystals, which were collected on a suction filter, washed and then dried to obtain a compound of the following formula (11).

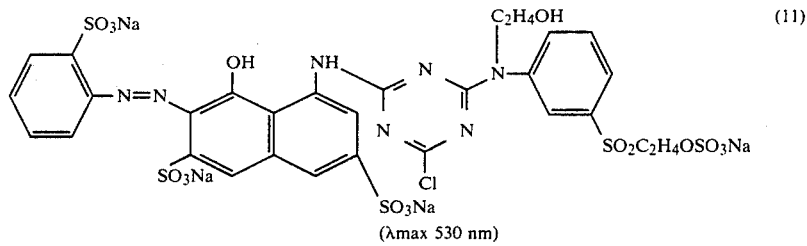

(λmax 530 nm)

DYEING EXAMPLE 3

The compound of the formula (11) (0.3 part) was dissolved in water (200 parts), and sodium sulfate (20 parts) was added thereto to prepare a dye bath. Cotton (10 parts) was dipped into the dye bath, and the bath was heated to a temperature of 50° C. 30 Minutes thereafter, sodium carbonate (4 parts) was added thereto, and the dyeing was continued for 1 hour at that temperature. After completion of the dyeing, the cotton was washed with water and then soaped to obtain a dyed product of a deep red color excellent in various fastness.

EXAMPLES 12 TO 15

A manner similar to that of Example 11 was repeated to obtain each compound as shown below, which was used for dyeing cotton in the same manner as in Dyeing Example 3 to obtain a dyed product of a shade as shown below having excellent fastness.

| Example No. | Formula | Shade |
|---|---|---|
| 12 | 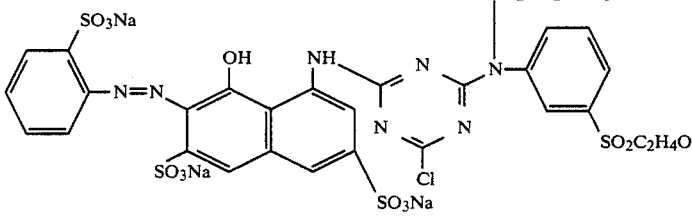 | Red |
| 13 | 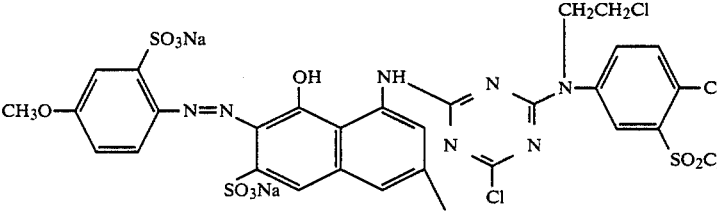 | Bluish red |
| 14 | 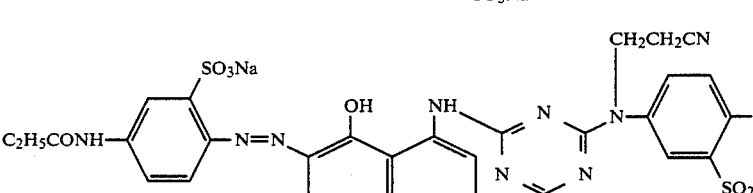 | Bluish red |
| 15 | 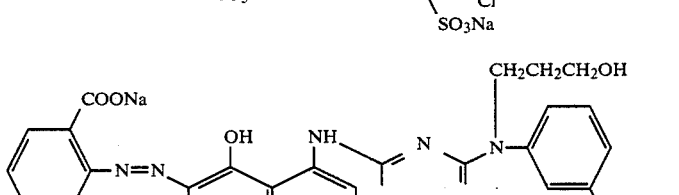 | Red |

EXAMPLE 16

Cyanuric chloride (9.2 parts) was added and dispersed at a temperature of between 0° to 5° C. into a solution prepared by dissolving a nonionic surfactant (0.1 part) in water (100 parts). To this dispersion, a solution prepared by dissolving H acid (16 parts) in water (200 parts) at a pH of between 7 and 8 was added dropwise at a temperature of between 0° and 5° C. taking over 1 hour. After completion of the addition, a 20% aqueous solution of sodium carbonate was added thereto to adjust the pH to 3, and the mixture was stirred for 2 hours. Then, sodium hdyrogencarbonate (14 parts) was added thereto. A solution prepared by diazotizing anthranilic acid (6.8 parts) in a conventional manner was added to the above mixture at a temperature of between 0° and 5° C. taking over 1 hour. The resulting mixture was stirred for 4 hours at that temperature, and then adjusted to a pH of between 5 and 6 by the addition of hydrochloric acid. 1-N-Methylamino-benzene-3-β-sulfatoethylsulfone (14 parts) was added thereto, and the mixture was heated to a temperature of 40° C., while adding a 20% aqueous solution of sodium carbonate to adjust the pH to between 5 and 6, and stirred for 6 hours at that temperature.

Sodium chloride (40 parts) was added to the reaction mixture to deposit crystals, which were then collected on a suction filter, washed and dried at a temperature of 60° C. Thus, a compound of the following formula (16) was obtained.

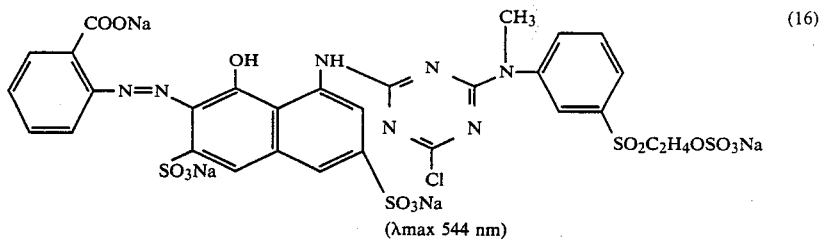

(λmax 544 nm)

DYEING EXAMPLE 4

The compound of formula (16) (0.3 part) was dissolved in water (200 parts), and sodium sulfate (30 parts) was added thereto to prepare a dye bath. Cotton (10 parts) was dipped into the bath, and the bath was heated to a temperature of 70° C. 20 Minutes thereafter, sodium carbonate (5 parts) was added to the bath, and the dyeing was continued for 1 hour at that temperature. After completion of the dyeing, the cotton was washed with water and soaped to obtain a dyed product of a deep bluish red color excellent in various fastness.

EXAMPLES 17 TO 20

A manner similar to that of Example 16 was repeated to obtain each compound as shown below, which was then used for dyeing cotton in the same manner as in Dyeing Example 4 to obtain a dyed product of a shade as shown below having excellent fastness.

| Example No. | Formula | Shade |
| --- | --- | --- |
| 17 | (structure with SO₃Na, OH, NH, N=N, C₂H₄COONa, SO₂C₂H₄OSO₃Na, Cl, SO₃Na) | Red |
| 18 | (structure with CH₃, SO₃Na, OH, NH, N=N, C₂H₄CONH₂, C₂H₅, SO₂C₂H₄OSO₃Na, Cl, SO₃Na) | Bluish red |
| 19 | (structure with COONa, OCH₃, OH, NH, N=N, C₂H₄COOCH₃, SO₂C₂H₄OSO₃Na, Cl, SO₃Na) | Bluish red |

| Example No. | Formula | Shade |
|---|---|---|
| 20 | 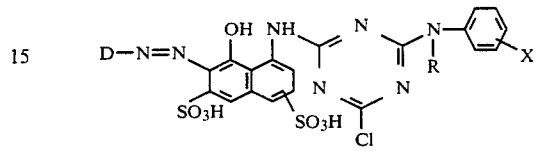 | Red |

DYEING EXAMPLE 5

| Composition of color paste | |
|---|---|
| Compound of formula (1) | 4 parts |
| Urea | 5 parts |
| Thickner, sodium alginate (5%) | 50 parts |
| Hot water | 25 parts |
| Sodium hydrogencarbonate | 2 parts |
| Balance | 14 parts |

Mercerized cotton broad cloth was printed with the above color paste and then pre-dried, steamed for 5 minutes at 120° C., washed with hot water, soaped, washed with hot water, and dried.

Thus, a printed product of a red color excellent in various fastness was obtained.

What is claimed is:

1. A compound represented by a free acid of the formula,

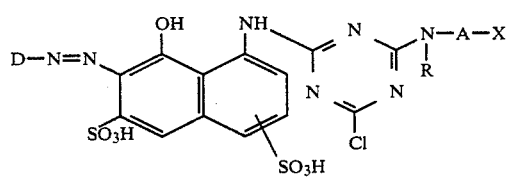

wherein D is a phenyl group substituted with one to three substitutents selected from the group consisting of halogen atoms and methyl, ethyl, methoxy, ethoxy, acetylamino, propionylamino, sulfo and carboxyl groups, R is a $C_1$ to $C_4$ alkyl group unsubstituted or substituted with a halogen atom or a hydroxyl, cyano, alkoxy, carboxyl, carbamoyl, alkoxycarbonyl or sulfo group, A is a phenylene group unsubstituted or substituted with one or two substituents selected from the group consisting of methyl, ethyl, methoxy, ethoxy and sulfo groups and chlorine and bromine atoms, or a naphthylene group unsubstituted or substituted with one sulfo group, and X is $-SO_2CH=CH_2$ or $-SO_2CH_2CH_2Y$ in which Y is a group capable of being split by the action of an alkali.

2. A compound represented by a free acid of the formula,

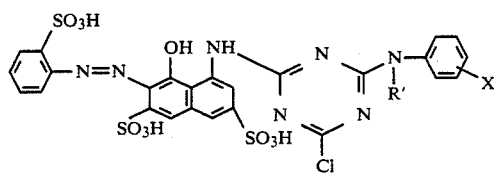

wherein D is a phenyl group substituted with one to three substituents selected from the group consisting of halogen atoms and methyl, ethyl, methoxy, ethoxy, acetylamino, propionylamino, sulfo and carboxyl groups, R is a $C_1$ to $C_4$ alkyl group unsubstituted or substituted with a halogen atom or a hydroxyl, cyano, alkoxy, carboxyl, carbamoyl, alkoxycarbonyl or sulfo group, and X is $-SO_2CH=CH_2$ or $-SO_2CH_2CH_2Y$ in which Y is a group capable of being split by the action of an alkali.

3. A compound represented by a free acid of the formula,

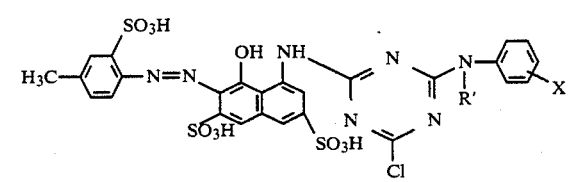

wherein X is a group capable of being split by the action of an alkali, and R' is a $C_1$ to $C_4$ alkyl group.

4. A compound represented by a free acid of the formula,

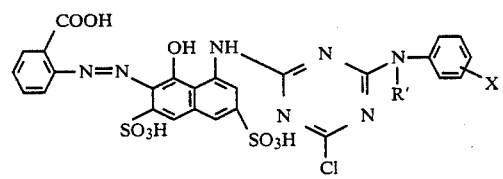

where X is a group capable of being split by the action of an alkali, and R' is a $C_1$ to $C_4$ alkyl group.

5. A compound represented by a free acid of the formula,

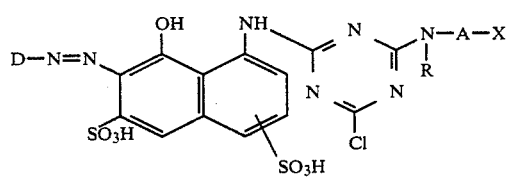

wherein X is a group capable of being split by the action of an alkali, and R' is a $C_1$ to $C_4$ alkyl group.

* * * * *